United States Patent [19]

Bright

[11] Patent Number: 4,599,153

[45] Date of Patent: Jul. 8, 1986

[54] SELECTIVE EXTRACTION OF RHENIUM FROM AQUEOUS SULFURIC ACID SOLUTIONS

[75] Inventor: John H. Bright, Kendall Park, N.J.

[73] Assignee: American Cyanamid Company, Stamford, Conn.

[21] Appl. No.: 457,784

[22] Filed: Jan. 13, 1983

[51] Int. Cl.$^4$ .................. C25C 1/00; C01G 47/00
[52] U.S. Cl. .................. 204/105 R; 423/49; 75/101 BE
[58] Field of Search ............ 423/49; 75/101 BE; 204/105 R

[56] References Cited

U.S. PATENT DOCUMENTS

| | | | |
|---|---|---|---|
| 3,751,555 | 8/1973 | Peterson | 423/49 |
| 3,952,579 | 1/1976 | Morgan | 423/49 |
| 4,000,244 | 12/1976 | Mollerstedt et al. | 423/49 |

OTHER PUBLICATIONS

Kertes, "J. of the Chem. Soc.", vol. 5, 1961, pp. 1921-1925.
Marcus et al., "Ion Exchange & Solvent Extraction of Metal Complexes", Wiley-Interscience, N.Y., 1969, pp. 650-660, 706-716.

Primary Examiner—H. T. Carter
Attorney, Agent, or Firm—Henry C. Jeanette; John W. Cornell; Michael J. Kelly

[57] ABSTRACT

The present invention relates to the selective extraction of rhenium metal from aqueous sulfuric acid solutions. More particularly, it relates to the selective extraction of rhenium metal from sulfuric acid leach solutions, resulting from the leaching of spent petroleum reforming catalysts, by the use of tertiary phosphine oxide extraction compounds.

11 Claims, No Drawings

SELECTIVE EXTRACTION OF RHENIUM FROM AQUEOUS SULFURIC ACID SOLUTIONS

The present invention relates to the selective extraction of rhenium metal from aqueous sulfuric acid solutions. More particularly, it relates to the selective extraction of rhenium metal from sulfuric acid leach solutions, resulting from the leaching of spent petroleum reforming catalysts, by the use of tertiary phosphine oxide extraction compounds.

Rhenium is an essential element, along with platinum, in the production of petroleum reforming catalysts. Recovery of these valuable metals from spent catalysts is obviously desirable. One method for recovering the metals is to leach them from the spent catalyst with sulfuric acid. The resulting leach solution contains, ordinarily, less than 100 ppm of rhenium metal, along with various other metals in appreciable amounts, including aluminum, which is generally present at a level of more than 3%. A satisfactory method is available for the recovery of platinum metal from the catalysts, but rhenium recovery is at present a time consuming operation. A reduction in the time required to recover rhenium metal, particularly in a selective manner, would represent an economically significant improvement.

The present invention provides an efficient and economical process for the extraction of rhenium metal from aqueous sulfuric acid solutions and, more particularly, for the selective recovery of rhenium metal from sulfuric acid solutions containing other metals, which process comprises contacting the aqueous rhenium-containing sulfuric acid solution with a tertiary phosphine oxide compound, separating the resulting rhenium-phosphine oxide complex therefrom, and recovering the rhenium metal from the complex by contacting the complex with a suitable stripping agent.

In accordance with the invention, a rhenium-containing sulfuric acid solution is contacted with a tertiary phosphine oxide extractant compound. Tertiary phosphine oxides which are suitable for use in the present invention as rhenium metal extractants are those which are represented by the formula:

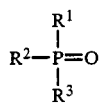

wherein $R^1$, $R^2$ and $R^3$ are each, independently, selected from alkyl containing from 6 to 20 carbon atoms, cycloalkyl, aryl, alkyl-substituted aryl, aralkyl and alkyl-substitued aralkyl. Illustrative examples of suitable tertiary phosphine oxides include, but are not limited to, tri-n-hexylphosphine oxide (THPO), tri-n-octylphosphine oxide (TOPO), tris(2,4,4-trimethylpentyl)phosphine oxide (TMPPO), tricyclohexyl phosphine oxide (TCHPO), tri-n-dodecyl phosphine oxide, tri-n-octadecyl phosphine oxide, tris(2-ethylhexyl) phosphine oxide, di-n-octylethyl phosphine oxide, di-n-hexylisobutyl phosphine oxide, octyldiisobutyl phosphine oxide, triphenylphosphine oxide, tribenzylphosphine oxide, di-n-hexylbenzylphosphine oxide, di-n-octylbenzylphosphine oxide, di-n-octylphenylphosphine oxide, and the like. The preferred tertiary phosphine oxide compounds are tri-n-octyl phosphine oxide (TOPO), tri-n-hexyl phosphine oxide (THPO), and tris(2,4,4-trimethylpentyl)phosphine oxide (TMPPO).

The extraction of rhenium from aqueous sulfuric acid solutions in accordance with the invention may be accomplished by (a) solvent extraction, wherein the aqueous rhenium-containing sulfuric acid solution is contacted with a water-immiscible organic solvent solution of the tertiary phosphine oxide compound, whereby the rhenium reports to the organic solution as a rhenium-phosphine oxide complex, or (b) by a supported extraction, whereby the aqueous rhenium-containing sulfuric acid solution is passed over or through an inert support material having absorbed thereon or encapsulated therein the tertiary phosphine oxide compound, whereby the rhenium metal is retained on the support material.

The solvent extraction process is generally preferred for relatively high concentrations of rhenium metal and the supported extraction for relatively low concentrations.

In the solvent extraction process the tertiary phosphine oxide compound is generally, and preferably, dissolved in a suitable water-immiscible organic hydrocarbon solvent. However, if the tertiary phosphine oxide, or mixture of phosphine oxides, is a liquid at the temperature of the extraction, it may be used neat. Suitable water-immiscible organic hydrocarbon solvents include, but are not limited to, aromatic hydrocarbons, such as toluene and xylene; cyclohexane, naphtha, kerosine compositions, and the like. A preferred solvent is an aliphatic or aromatic petroleum distillate composition of the kind available commercially as, for example, Kermac 470B (Kerr-McGee, Inc.), Varsul DX-3641 (Exxon Co.), Ashland 360 (Ashland Oil Co.), or Solvesso 150 (Exxon Co.).

In general, the tertiary phosphine oxide compound, or mixture thereof, is used in the solution in an amount ranging from about 20 to about 500 grams per liter of solution, and preferably from about 200 to 350 grams per liter. Usually, it is desirable to contact the aqueous solution with as concentrated a solution of extractant as practicable.

The aqueous sulfuric acid solutions which are extracted in accordance with the invention usually will contain from about 0.1 to about 5000 micrograms of rhenium per milliliter of solution and, more commonly, from about 80 to about 250 micrograms of rhenium per milliliter.

The pH of the aqueous sulfuric acid solution is important, since efficient extraction of rhenium with good phase disengagement is achieved when the pH is in the range of from about −0.5 to about!3.0 and, preferably, from about 0.1 to 0.7.

The ratio of the!aqueous phase (A) to the organic extractant phase (O), i.e.,!the A/O ratio, may be in the range of from about 0.1 to 1000, but it is preferably in the range of about 3 to 100.

The solvent extraction process may be conducted at a temperature in the range of from about 20° C. to about 85° C. and contact time between the two phases may vary between about 1 and 60 minutes. In carrying out the process of the invention solvent extraction techniques compatible with an extraction solution include, but are not limited to, liquid-liquid extraction usng either mixer-settlers or columns, such as the reciprocating plate extraction column, pulse columns or columns employing rotating impellers.

When the extraction is conducted using a supported phosphine oxide extractant, the support material will ordinarily contain from about 10 to 60 weight percent of the phosphine oxide compound encapsulated therein or absorbed thereon. Preferably, the phosphine oxide is encapsulated in a macroporous styrene-divinylbenzene copolymer to the extent of about 40% by weight. The ratio of phosphine oxide extractant on the support to the rhenium in solution should range from about 0.5 to about 1000 moles per gram-atom of rhenium and, preferably, 10 to 400 moles per gram-atom of rhenium.

The supported extractant may either be slurried with the aqueous rhenium-containing solution or the solution may be passed over or through the supported phosphine oxide in a column. Contact time between the aqueous solution and the supported extractant may vary widely from about 1 minute to many hours, but in general, the contact time will be in the range of about 15 minutes to 20 hours and will also depend on the temperature of the extraction, which is normally in the range of about 20° C. to 50° C.

Usually the rhenium metal to be extracted from the aqueous solution will be accompanied by other dissolved metals, including aluminum, calcium, iron and magnesium. Aluminum may be present in high concentration, i.e., greater than 3%. When the extraction process of the invention is used, rhenium is selectively separated from these metals. Thus, when rhenium extraction is high, little to none of the aluminum, calcium or magnesium are co-extracted and only 2–4% of the iron present is co-extracted.

Following extraction of the rhenium metal from solution, either by solvent extraction, wherein the phosphine oxide-rhenium complex is in solution in the organic extractant phase, or by supported extraction, wherein the phosphine oxide-rhenium complex is retained on the support, the rhenium metal must be recovered from the complex by a suitable stripping procedure.

In accordance with the present invention, there is provided a method for stripping the rhenium metal from its phosphine oxide complex, said method comprising contacting the organic solvent solution containing the complex, as the inert support containing the complex, with an aqueous solution of an ammonium salt, preferably ammonium sulfate, whereby the rhenium metal is stripped from the complex and reports to the aqueous phase.

The stripping solution generally will contain the ammonium salt in an amount of from about 1 to 80% by weight, preferably 5 to 20% by weight. The ratio of stripping solution to organic extractant solution may vary widely from 1 to 100 volumes of stripping solution per volume extractant solution. However, 1–2 volumes per volume of organic extractant solution is preferred. When the rhenium-phosphine oxide complex is retained on a support material, the stripping solution is passed through or over the support material to receiver the rhenium from the complex.

The rhenium metal may be recovered from the stripping solution by conventional electrowinning or concentration methods.

The following non-limiting examples further illustrate the invention.

EXAMPLE 1

Aqueous solutions of perrhenate were prepared from potassium perrhenate (KReO$_4$) and 5N sulfuric acid, providing a solution containing 232 micrograms ($\mu$g) of rhenium per milliliter at pH 1.8 and a solution containing 223 $\mu$g/ml at pH 0.7.

These solutions were contacted with tri-n-octylphosphine oxide (TOPO) dissolved in Kermac 470B (Kerr-McGee). The extractions were conducted at 50° C. using an A/O ratio of 3.3 and a contact time of 30 minutes. Data are given in Table I.

TABLE I

| TOPO Extraction of Aqueous Rhenium Solutions | | | | |
|---|---|---|---|---|
| Rhenium Conc. ($\mu$g/ml) | pH | Extractant Conc. (g/L) | Moles TOPO gr. at. Re | % Extracted |
| 232 | 1.8 | 230 | 145 | 73 |
| 223 | 0.7 | 230 | 151 | 98 |

EXAMPLE 2

The aqueous perrhenate solutions from Example 1 (33 ml. each) were slurried with 5.75 grams of macroreticular polystyrene beads containing encapsulated therein 40% by weight of TOPO. Contact was achieved by mechanical stirring at 25° C. for 19 hours. Data are given in Table II.

TABLE II

| Supported TOPO Extraction of Aqueous Rhenium Solutions | | | |
|---|---|---|---|
| Rhenium Conc. ($\mu$g/ml) | pH | Moles TOPO gr. at. Re | % Re Extracted |
| 232 | 1.8 | 145 | 99 |
| 223 | 0.7 | 151 | 99.9 (<250 ppb Re) |

EXAMPLE 3

A leach liquor obtained by leaching a spent petroleum reforming catalyst with sulfuric acid contained the following elements:

| Element | Concentration, $\mu$g/ml |
|---|---|
| Rhenium | 86.1 |
| Aluminum | 35,700 |
| Calcium | 128 |
| Iron | 405 |
| Magnesium | 43 |
| Titanium Nickel Chromium manganese zinc | each <10 ppm |

The solutions had a pH of 1.6 and a sp. gr. of 1.23 g/l.

The procedure of Example 1 was followed to extract rhenium from the solution directly (at pH 1.6) and following pH adjustment to 0.4 with sulfuric acid. Data are given in Table III.

TABLE III

| TOPO Extraction of Aqueous Leach Liquor | | | | |
|---|---|---|---|---|
| Rhenium Conc. ($\mu$g/ml) | pH | Moles TOPO gr. at. Re | Phase Disengagement | % Rhenium Extracted |
| 86.1 | 1.6 | 370 | Poor | 92 |
| 84 | 0.4 | 374 | Clean | 97 |

EXAMPLE 4

The procedure of Example 2 was followed to extract rhenium from the leach liquor described in Example 3. Data are given in Table IV.

TABLE IV

Supported TOPO Extraction of Aqueous Leach Liquor

| Rhenium Conc. (μg/ml) | pH | Moles TOPO gr. at. Re | % Rhenium Extracted |
|---|---|---|---|
| 86.1 | 1.6 | 374 | 95 |
| 84 | 0.4 | 373 | 98 (2 ppm rhenium residue) |

EXAMPLE 5

The aqueous leach liquor described in Example 3 was contacted with solutions of TOPO in Kermac 470B at various A/O ratios. The pH was adjusted with $H_2SO_4$. Data are given in Table V.

TABLE V

TOPO/Kermac 470B Solvent Extraction of Aqueous Leach Liquor at Various A/O Ratios

| Exp. No. | Rhenium Conc. μg/ml | pH | TOPO Conc. g/L | Temp. °C | Time Hr | A/O | Moles TOPO g at Re | pH after Extraction | Phase Disengagement | % Extracted Re | Al | Mg | Ca | Fe |
|---|---|---|---|---|---|---|---|---|---|---|---|---|---|---|
| A | 86 | 1.6 | 160 | 50 | 0.5 | 10 | 90/1 | 1.7 | Some Precipitate | 72 | — | — | — | — |
| — | 86 | 1.6 | 160 | 50 | 0.5 | 25 | 35/1 | — | Gross Precipitate | — | — | — | — | — |
| B | 86 | 1.6 | 160 | 50 | 0.5 | 83 | 11/1 | 1.8 | Excellent | 35 | — | — | — | — |
| C | 84 | 0.1 | 160 | 50 | 0.5 | 10 | 91/1 | −0.05 | Excellent | 95 | — | — | — | — |
| D | 84 | 0.1 | 160 | 50 | 0.5 | 25 | 36/1 | −0.1 | Slow | 96 | None | None | None | 4% |
| E | 81 | 0.2 | 230 | 47 | 0.25 | 50 | 27/1 | 0.3 | Excellent | 84 | — | — | — | — |
| F | 84 | 0.1 | 160 | 50 | 0.5 | 83 | 11/1 | 0.0 | Some Interface | 93 | None | None | None | 2% |

EXAMPLE 6

The organic extractant solutions containing the phosphine oxide-rhenium complexes from Table V were then stripped with several stripping solutions. The organic solutions (18 ml) were contacted with 36 ml of the stripping solutions in a stirred flask. The aqueous stripping solutions were then analyzed for rhenium recovered. Data are given in Table VI.

TABLE VI

Stripping of the TOPO/Kermac 470B-Rhenium Organic Extracts by Selected Aqueous Solutions 50° C.; One-half Hour Contract; A/O = 2

| Exp. No. | Stripping Reagent pH | Stripping Reagent Type | pH after Extraction | Phase Disengagement | % of Rhenium Extracted Recovered | Stripping Solution Concentration μg/ml Re | Al | Mg | Ca | Fe |
|---|---|---|---|---|---|---|---|---|---|---|
| A | 5.1 | 10 wt % $(NH_4)_2SO_4$ | 3.3 | Emulsion | — | — | — | — | — | — |
| B | 3.8 | 10 wt % $NH_4Cl$ | 2.8 | Excellent | 48% | — | — | — | — | — |
| C | 0.4 | 10 wt % $H_2SO_4$ | 0.4 | Excellent | 1 | — | — | — | — | — |
| D | 5.1 | 10 wt % $(NH_4)_2SO_4$ | 2.4 | Excellent | 78 | 804 | 4.4 | <0.5 | 0.5 | 0.6 |
| F | 5.1 | 10 wt % $(NH_4)_2SO_4$ | 3.0 | Excellent | 73 | 2146 | 5.3 | <0.5 | 0.7 | 0.6 |

What is claimed is:

1. A process for the selective extraction of rhenium from aqueous sulfuric acid solutions having a pH in the range of from about −0.5 to about 3.0, said process consisting essentially of:

(1) contacting said aqueous sulfuric acid solution with a tertiary phosphine oxide extractant compound having the structure:

wherein $R^1$, $R^2$ and $R^3$ are each, independently, selected from the group consisting of alkyl of 6 to 20 carbon atoms, cycloalkyl, aryl, aralkyl, alkyl-substituted aryl and alkyl-substituted arallyl;

(2) separating the resulting phosphine oxide-rhenium complex from said aqueous solution; and (3) recovering the rhenium from said complex.

2. A process in accordance with claim 1 wherein said tertiary phosphine oxide compound is dissolved in a water-immiscible hydrocarbon solvent.

3. A process in accordance with claim 2 wherein said hydrocarbon solvent is an aromatic or aliphatic petroleum distillate composition.

4. A process in accordance with claim 1 wherein said tertiary phosphine oxide compound is tri-n-octylphosphine oxide.

5. A process in accordance with claim 1 wherein said tertiary phosphine oxide compound is absorbed on or encapsulated in an inert support material.

6. A process in accordance with claim 5 wherein said inert support material is a styrene-divinylbenzene copolymer.

7. A process for the selective extraction of rhenium from aqueous sulfuric acid solutions having a pH in the range of from about −0.5 to about 3.0, said process consisting essentially of:

(a) contacting said aqueous sulfuric acid solution with a tertiary phosphine oxide extractant compound having the structure:

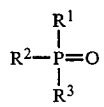

wherein $R^1$, $R^2$ and $R^3$ are each, independently, selected from the group consisting of $C_6$–$C_{20}$ alkyl, cycloalkyl, aral, aralkyl, alkyl-substituted aryl and alkyl-substituted aralkyl;

(b) separating the resulting phosphine oxide-rhenium complex from said aqueous acid solution;

(c) contacting the phosphine oxide-rhenium complex with an aqueous solution of an ammonium salt, whereby the rhenium is stripped from the complex and reports to the aqueous ammonium salt solution; and (d) thereafter, recovering the rhenium from said aqueous ammonium solution by electrowinning methods.

8. A process in accordance with claim 7 wherein said tertiary phosphine oxide-rhenium complex is in solution in a water-immiscible hydrocarbon solvent.

9. A process in accordance with claim 7 wherein said complex is absorbed on an inert support material.

10. A process in accordance with claim 9 wherein said support material is a styrene-divinylbenzene copolymer.

11. A process in accordance with claims 7, 8, 9 or 10 wherein said ammonium salt is ammonium sulfate.

* * * * *

UNITED STATES PATENT OFFICE
CERTIFICATE OF CORRECTION

Patent No. 4,599,153　　　　　　　　　　Dated July 8, 1986

Inventor(s) John H. Bright

It is certified that error appears in the above-identified patent and that said Letters Patent are hereby corrected as shown below:

Column 6, line 4, "arallyl", should read -- aralkyl --.

Signed and Sealed this

Twenty-third Day of September 1986

[SEAL]

*Attest:*

DONALD J. QUIGG

*Attesting Officer*　　*Commissioner of Patents and Trademarks*